US008640945B1

(12) United States Patent
McCormick

(10) Patent No.: US 8,640,945 B1
(45) Date of Patent: Feb. 4, 2014

(54) METHODS AND APPARATUS FOR MANAGING CASH ITEMS

(76) Inventor: Ian McCormick, West Chester, PA (US)

( * ) Notice: Subject to any disclaimer, the term of this patent is extended or adjusted under 35 U.S.C. 154(b) by 377 days.

(21) Appl. No.: 13/094,961

(22) Filed: Apr. 27, 2011

Related U.S. Application Data

(60) Provisional application No. 61/328,601, filed on Apr. 27, 2010, provisional application No. 61/347,234, filed on May 21, 2010.

(51) Int. Cl.
*G06F 19/00* (2011.01)

(52) U.S. Cl.
USPC .......................................................... 235/379

(58) Field of Classification Search
USPC .................................. 235/379; 902/9, 13, 17
See application file for complete search history.

(56) References Cited

U.S. PATENT DOCUMENTS 5,900,607 A * 5/1999 Awatsu et al. ................ 235/379
6,378,770 B1 * 4/2002 Clark et al. ................... 235/379
6,540,136 B1 * 4/2003 Ross ............................. 235/379
7,331,513 B2 * 2/2008 Force et al. ................... 235/379
7,419,090 B2 * 9/2008 Sawa ............................ 235/379
2009/0242626 A1 * 10/2009 Jones et al. ................... 235/379

* cited by examiner

*Primary Examiner* — Seung Lee
(74) *Attorney, Agent, or Firm* — Goodwin Procter LLP

(57) ABSTRACT

Methods and apparatus for managing cash items are disclosed. For example, a predetermined or calculated amount/composition of rolled coins may be dispensed based on a count of loose coins, or a mixture of rolled and/or loose coins may be dispensed based on a command from a cash management software program or module. Coins from an end of day deposit may be utilized to calculate a dispense requirement for start-of-day till preparation. A self-service device such as a kiosk, self-checkout lane, or payment island may be configured to also perform cash management tasks and/or to transmit an output to a back office and/or bank to receive provisional credit. Change orders, bank deposits, and/or other cash service tasks may be automated in various aspects including, for instance, scheduling, preparation of cash items (e.g., with predetermined or optimized amount/composition), central management of business rules, and reconciliation of fulfillment with invoices or SLAs.

9 Claims, 5 Drawing Sheets

METHODS AND APPARATUS FOR MANAGING CASH ITEMS

CROSS-REFERENCE OF RELATED APPLICATIONS

The present application claims priority to: (1) U.S. Provisional Application No. 61/328,601, entitled METHODS AND APPARATUS FOR MANAGING CASH ITEMS, filed Apr. 27, 2010, and (2) U.S. Provisional Application No. 61/347,234, filed May 21, 2010, entitled SYSTEMS AND METHODS FOR CASH MANAGEMENT. Both of the provisional applications are incorporated by reference herein in their entireties.

FIELD OF THE INVENTION

The present invention relates generally to cash management and workflow management. More particularly, the present invention relates to methods and apparatus for managing cash items such as coins and banknotes as well as cash-like items such as tokens, food stamps, gift cards, and vouchers.

BACKGROUND OF THE INVENTION

Retail stores, banks, cash centers, casinos, sports arenas, as well as other types of establishments handle a significant amount of cash on a daily basis. Although payment cards, such as credit cards, debit cards, and stored value cards, are now widely used by customers, it is still an inevitable part of retail, banking, armored car, cash centers and other businesses to receive cash payments and handle/process cash or cash-like items. Be it a large department store, a small convenience store, a bank, a vending operator, a casino, a sports arena, a restaurant (including quick-serve or fast-food restaurant), or any other type of retail-like business, each establishment that accepts cash payments or processes cash for retailers or consumers faces considerable costs involved in the management of cash and cash-like items.

While it directly impacts the books of a cash-accepting or cash-processing business, cash management is surprisingly inefficient. Significant costs and losses can be attributed to inefficient cash management processes in place today.

Cash management includes the handling of all types of cash or cash-like items (hereinafter “cash items”), including coins, banknotes, tokens, vouchers, and gift cards etc. In terms of coin management, most retailers either manage coins manually or resort to discrete or ad hoc mechanisms for counting coins, where loose coins and rolled coins are always counted, dispensed, or otherwise handled separately. There is also no efficient solution for handling rolled and loose coins concurrently with banknotes.

Cash handling at the beginning and the end of retail shifts (or days) has been quite inefficient. Retail employees typically spend a significant amount of time manually preparing till drawers, which process includes receiving a certain mix of coins and notes, manually counting those cash items to confirm the correct amount, and filling the till drawer. At the end of the shift, a similarly mundane, time-consuming, and error-prone process is repeated such that the cash items could be counted and eventually put away in a vault or safe, or used to prepare the till for the next shift. If sorting/counting devices are used at all, separate ones are often employed to handle loose coins, rolled coins, and banknotes, respectively. Similar inefficiencies exist for other parties such as banks and armored car companies who also routinely handle cash items.

Moreover, retailers’ interactions with service providers, such as armored car companies, banks, and other third parties still rely on uncontrolled decisions and/or actions of in-store personnel and lack a disciplined approach. Even if specific rules or guidelines may be put in place to govern the personnel’s handling of cash items, there has been no meaningful control mechanism to ensure strict compliance with the rules and guidelines. As a result, an armored car crew could arrive at a store only to find out that deposits (typically banknotes with denominations of $10 and above) are not ready yet for pick up. Or, conversely, an excessive amount of cash could be accumulating at the store or excess float may be held, all due to lack of automation and control.

Furthermore, not all stores can benefit from provisional credit from their depository banks. To benefit from provisional credit, a retail store has to invest in and deploy sophisticated (and expensive) equipment such as intelligent safes that count and validate cash deposits as they are secured in the safe on the retailer’s premises. The intelligent safes will time- and date-stamp all the deposit transactions, and the information about the safe’s contents, and the transactional history is communicated to authorized remote parties (e.g., the banks offering provisional credit). Only with the ability to know the secured cash value of a safe’s contents, could a depository bank be willing to credit the retailer’s bank account even before the corresponding cash deposit is physically received. The provisional credit is given, for example, as soon as the cash is deposited into the intelligent safe, overnight, or when a CIT service provider confirms to the bank the pickup of the cash. The retailer typically has to utilize armored car companies for the provisional credit service. With all these costs associated with the current process, many retail stores simply cannot afford or are unwilling to take advantage of provisional credit.

Overall, there has not been a well-defined or automated approach to manage coins and/or banknotes in general in a retail environment and the like. Nor is there any suitable hardware to enable more efficient and more effective handling of rolled and loose coins, such as the beginning-of-shift and the end-of-shift processes. Similar cash management problems and deficiencies exist at a bank branch or in retail “off-site” processing of cash items in general.

In view of the foregoing, it may be understood that there are significant problems and shortcomings associated with current cash management in retail environments and the like.

SUMMARY OF THE INVENTION

Methods and apparatus for managing cash items are disclosed. For example, a predetermined or calculated amount/composition of rolled coins may be dispensed based on a count of loose coins, or a mixture of rolled and/or loose coins may be dispensed based on a command from a cash management software program or module. Coins from an end of day deposit may be utilized to calculate a dispense requirement for start-of-day till preparation. A self-service device such as a kiosk, self-checkout lane, or payment island may be configured to also perform cash management tasks and/or to transmit an output to a back office and/or bank to receive provisional credit. Change orders, bank deposits, and/or other cash service tasks may be automated in various aspects including, for instance, scheduling, preparation of cash items (e.g., with predetermined or optimized amount/composition), central management of business rules, and reconciliation of fulfillment with invoices or SLAs.

In one particular exemplary embodiment, an apparatus for handling cash items may comprise: a sorting/counting device to receive and count cash items containing at least loose coins, and to sort said loose coins into a coin storage space; at least one storage module housing at least said coin storage space to receive said sorted loose coins; at least one processor to process data from said sorting/counting device and/or said at least one storage module and to output information concerning said cash items; at least one data storage device to record said data and/or said output information; at least one interface to communicate said data and/or said output information to one or more other devices or users; and a coin dispenser to dispense at least one roll of coins based on said data and/or said output information.

In another particular exemplary embodiment, a computer-implemented method for managing cash items may comprise: storing, in at least one storage medium, data associated with one or more business rules governing cash service orders; monitoring two or more cash-handling devices to automatically maintain a record of cash content in said two or more cash-handling devices; and issuing, by at least one processor and via at least one interface, an automatic cash service order based on said record of cash content in accordance with said one or more business rules.

In yet another particular exemplary embodiment, an apparatus for handling cash items may comprise: a sorting/counting device to receive and count cash items and to sort said cash items into at least one storage module; at least one processor to process data from said sorting/counting device; a first user interface to guide a consumer user through a self-service coin-counting or checkout procedure that uses said sorting/counting device; and a second user interface to interact with a non-consumer user in a cash management procedure that also uses said sorting/counting device.

The present invention will now be described in more detail with reference to exemplary embodiments thereof as shown in the accompanying drawings. While the present invention is described below with reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as described herein, and with respect to which the present invention may be of significant utility.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION OF THE INVENTION

Figure 1:
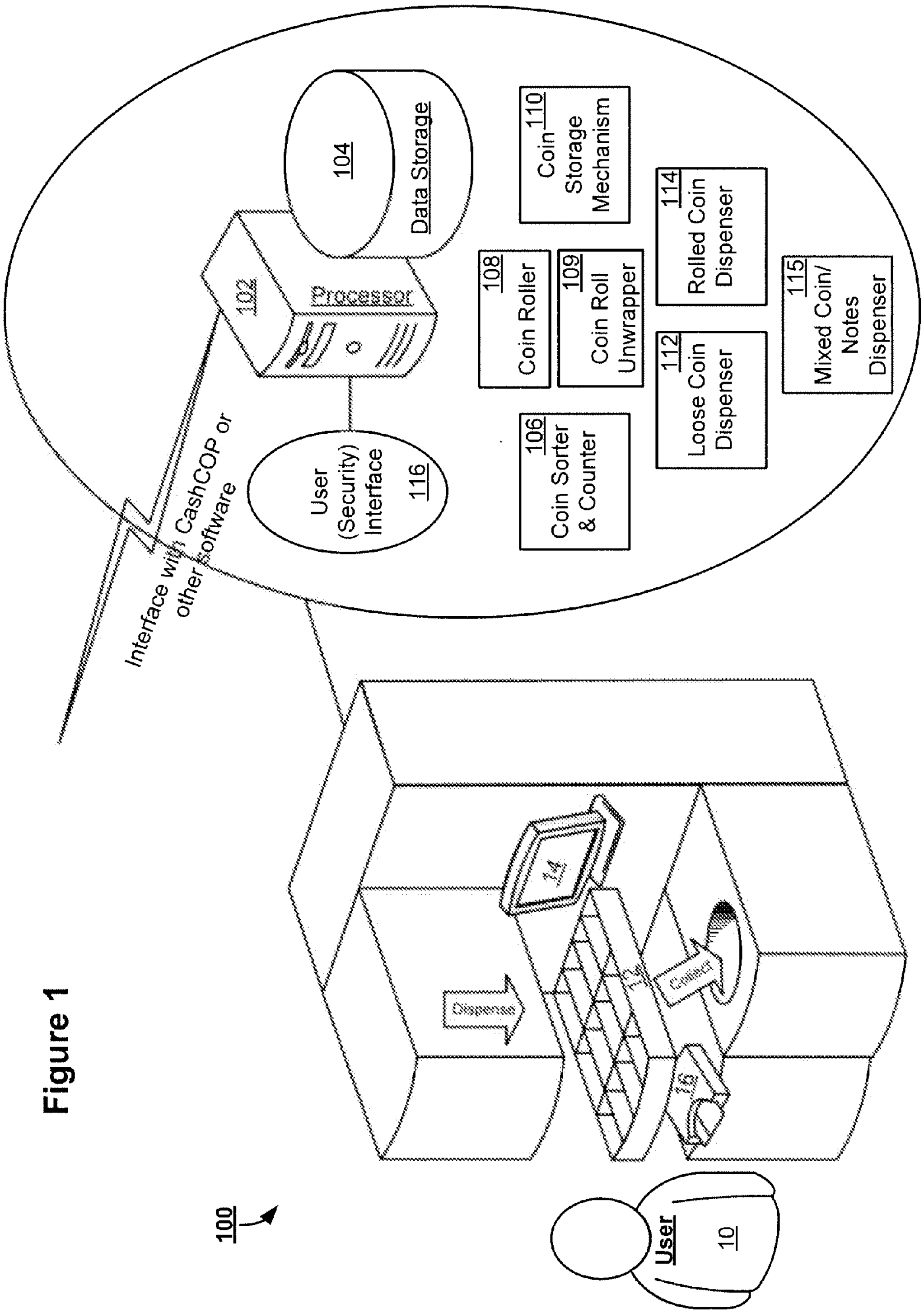
FIG. 1 shows an exemplary cash-handling apparatus in accordance with one embodiment of the present invention.

Embodiments of the present invention are generally related to improved cash management in a retail, bank, or other cash processing environment, which are also applicable to other contexts where coins, banknotes or other cash items are handled.

Certain details and specificities in the description herein are not meant to be limitations. For example, wherever the description appears to refer to a single device or apparatus, it should be appreciated that variations of the disclosed subject matter may include multiple devices or apparatus which may be linked either physically or through a link of data or may operate in coordination to accomplish an intended function. When a process is described as being automated or automatic, it should be appreciated that a similar process involving human actuation or requiring some user input is also contemplated. When a first event is described as occurring in realtime with respect to a second event, it should be appreciated that such first event may also occur in near realtime or later in time than the second event (e.g., at a specified time subsequent to the second event and/or in batch).

Furthermore, although frequent references are made to retail stores in the exemplary embodiments described below, those of ordinary skill in the art will appreciate that the present invention is not limited to the retail businesses but can be equally implemented in a wide variety of establishments wherever cash items are handled or processed, including but not limited to banks, cash processing centers, theaters, parks, museums, events or conferences, hotels, restaurants, sports arenas/stadiums, casinos, racing tracks, parking or transportation facilities, etc.

Overview

According to a first aspect of the present invention, a single device or multiple linked devices may be employed to count, store, and/or dispense both rolled and loose coins as desired. The device or devices may also be used for counting in and adding together the rolled and loose coin, or total coin and notes, and recording data of the combination of cash items. For example, a mixture of both rolled and loose coins, as well as banknotes, may be dispensed, from one or more devices (referred to herein as cash-handling apparatus or cash-handling devices) into a till or till cup(s), or a device for till preparation, to create or part-create a start-of-day (or start-of-shift) fund based on a calculated dispensing requirement. The cash-handling device(s) may be further employed to use a count of rolled coins (e.g., delivered by an armored car) and securely store them. The cash-handling device(s) may also be employed to count in loose coins and then calculate a value or composition of rolled coins to be dispensed.

It should be noted that, wherever the description herein mentions a till or till cup, the same may be applicable to a device or devices for till preparation, such as a device which fills a till or till cup or prepares bundles for insertion into a till or till cup. For example, the cash items may be first dispensed into such an intermediate device, and the device content may be subsequently transferred into till(s) or till cup(s).

According to a second aspect of the present invention, one or more cash-handling devices may use the cash items collected from an end-of-day (or end-of-shift) deposit to create or part-create a start-of-day (or start-of-shift, or at any time of the day) fund. Alternatively, the cash-handling device(s) may use the coins or notes detected or counted (e.g., by weighing) within a till, or use the data of the expected number of coins or notes (e.g., based on expected intake from sales transactions at cashier or self-checkout registers) as the basis for calculating the dispense requirements (i.e., a delta value) for the start-of-day (or start-of-shift) process (i.e., calculating the balance of coins needed rather than the full float requirements).

According to a third aspect of the present invention, one or more cash-handling devices may be implemented on a mobile platform that can be taken to the point-of-sales (POS) terminals to perform a variety of functions such as coin/note recycling, preparing, rebalancing or reconciling till contents, and skimming notes from cashier stations. The mobile platform may be linked to a back-office software component or device to exchange data therewith. Furthermore, output data from the POS may be used as a basis to schedule trips to the POS with the mobile device to either collect excess cash or provide change.

According to a fourth aspect of the present invention, the cash management system or the cash-handling device(s) may communicate with third parties and manage third-party deliveries and pickups of cash items in a more disciplined and at least partially automated fashion, for example, by generating triggers and specifying parameters for re-ordering of coins and dollar bills and for scheduling pickups, and by implementing procedures for counting-in and reconciling deliveries with orders and issuing credit notes if needed. The cash management system or the cash-handling device(s) may also optimize the value and/or denominations of cash items to be prepared for bank deposits.

According to a fifth aspect of the present invention, one or more cash-handling devices may be configured for both customer-facing functions (e.g., coin counting, self checkout, and change making) and cash management functions (e.g., start fund creation, end-of-day deposits, change making and reconciliation and counting of other tills). Equipment that are primarily or ostensibly customer-facing, such as coin-counting kiosks or self-checkout stands, can also be configured or adapted for in-store cash management tasks.

According to a sixth aspect of the present invention, a variety of self-scaling devices or containers can be implemented, in association with self-service devices, coin recyclers, note recyclers, coin sorters, note sorters, or coin counters, to allow all types of stores to obtain provisional credit from their depository banks. Such self-sealing devices or containers may each include a unique identifier or tagging device for security and data verification/reconciliation purposes. These devices or containers may be implemented with self-service equipment to transmit output data for purposes of receiving provisional credit.

One or more cash handling apparatus or devices may be provided to enable automated and streamlined end-of-day (or end-of-shift) cash counting and reconciliation and to improve beginning-of-day (or beginning-of-shift) cash-handling processes, as well as change giving and till rebalancing. The apparatus are adapted and configured to handle both rolled and loose coins as well as bank notes (e.g., dollar bills) and are capable of dispensing, automatically or upon user actuation, a predetermined or calculated amount of rolled coins or a mixture of rolled and loose coins or a mixture of coins and notes. Each cash-handling apparatus may be implemented with a single device or a number of linked devices operating in coordination with one another. One or more portions or the entirety of the cash-handling apparatus may be mobile and/or have wireless data connection(s) with the rest of the apparatus and/or one or more other devices. Variations of the coin-handling apparatus can also be dual-use models which can both count coins for or facilitate self-checkout by self-servicing consumers upon their demand and perform a store's coin or cash management tasks. The apparatus and related software may be further adapted to communicate and perform coin- or cash-related transactions with third parties, such as armored car companies and banks, based on predetermined business rules.

Main benefits of the present invention include but are not limited to: higher efficiency for coin and note counting and reconciliation, enhanced process control over management of cash items, reduction in float requirements, and improved business intelligence on in-store cash flow. More details, features, and advantages of the present invention can be appreciated with reference to the accompanying drawings and the detailed explanation below.

Cash-Handling Apparatus (Rolled and Loose Coins)

FIG. 1 shows an exemplary cash-handling apparatus 100 in accordance with one embodiment of the present invention. According to some embodiments of the present invention, the apparatus 100 may be referred to as a CoinCOP machine. Although depicted here as one integral piece of equipment, the apparatus 100 may be implemented in a more distributed fashion, such as with a system of discrete devices linked together. Some or all of these devices or portions of the apparatus 100 may be mobile.

Main functions of the apparatus 100 may include one or more of the following: (1) interacting with one or more users, for example, by authenticating a user, distinguishing the users' authority levels and/or roles, prompting the user with cash-handling instructions, enforcing workflow management and/or security measures; (2) allowing for double sign in on same activity, for purposes of loss prevention and verification; (3) receiving deposit of cash items (e.g., rolled and loose coins, and/or banknotes) by allowing a user to simply tip a till drawer 12 (or a coin bag or cash cassette), or placing rolled coin delivery or dollar bills, directly into the apparatus 100; (4) automatically sorting and counting cash items collected, including both rolled coins and loose coins, even banknotes; (5) recording the counted cash amount and passing the information to a cash management software program; (6) determining or receiving from a cash management software program a calculated dispense amount, which in some case can be based on the amount of leftover cash just received from, or detected in, a till drawer; (7) dispensing rolled coins or a mixture of rolled and loose coins according to the calculated dispense amount either directly in to a till or till cup or other device for filling the same; (8) communicating with external software and/or interfacing with third-party systems, for example, to schedule coin/notes delivery or pickup; (9) interacting with third-party users (e.g., coin/notes delivery personnel from a bank or armored car service) to receive delivery or facilitate pickup of coin/notes and reconcile with orders; (10) exchanging banknotes by dispensing rolled coins or a mixture of rolled and loose coins; (11) counting in coins and/or notes from a third party (e.g., armored car), securely storing them, and reconciling against a corresponding order, delivery request, or Service Level Agreement; and (12) adding the volumes or values of rolled coin and loose coin together in order to provide a cash position or calculate the need for a pickup and/or change order.

Accordingly, the apparatus 100 (or CoinCOP machine) may comprise a processor 102, one or more data storage devices 104, a user (security) interface 116, a coin sorter & counter 106, a coin roller 108, a coin roll unwrapper 109, a coin storage mechanism 110, a loose coin dispenser 112, a rolled coin dispenser 114, and a mixed coin/notes dispenser 115 (and/or coin recyclers or note recyclers). The apparatus 100 may further comprise a note dispenser, a note storage device, a note receiver, or a banknote validator, sorter & counter (not shown).

The coin sorter & counter 106 may be able to count both loose and rolled coins and sort them into corresponding storage space in the coin storage mechanism 110. The coin roller 108 is able to roll coins of the same denomination into standard- or custom-sized rolls for storage, dispensing, transport, and/or deposit. The coin roll unwrapper 109 is able to automatically strip a roll of coins and break it down into loose coins in order to add them to a till or till cup, or a device which dispenses to a till or till cup, or a device which adds the coins to a receptacle designed to fill a till or till cup. The loose coin dispenser 112, rolled coin dispenser 114, and mixed coin/notes dispenser 115 may work independently or in coordination with one another to dispense any predetermined or calculated amount of coins (rolled or mixed) and/or banknotes with a desired combination of denominations.

According to some embodiments of the present invention, the apparatus 100 may have a modular design based on the needs of a retailer. Not all the modules shown in FIG. 1 are necessary for each implementation. For example, a retailer may not need the capability of generating coin rolls. In that case, the coin roller 108 may be omitted from the apparatus 100. Some retailers may desire the ability to count and sort banknotes in the same machine. As a result, a note counter and a note dispenser may be incorporated into the apparatus 100 with little change to the rest of the components. It should be noted that some of the components of the apparatus 100 as depicted in FIG. 1 may be combined into or otherwise implemented as dual- or multi-function devices. For example, it is possible to implement both a coin sorter/counter and a rolled/loose coin dispenser in a single device.

According to other embodiments of the present invention, the apparatus 100 may or may not be implemented as a single device. A number of linked or networked devices may collectively perform the various functions and tasks designated for the apparatus 100. Therefore, while the description herein appears to refer to the apparatus 100 as one integrated device, it should be appreciated that a combination of two or more discrete devices may be used to accomplish the same or similar goals. Indeed, the present invention contemplates a network of cash-touching and/or cash-handling devices that may be distributed in a retail environment and its related facilities, which not only manage the coins and other cash items but also capture, report, and reconcile coin/notes information in substantial real-time or a regular or periodic basis (e.g., by end of day or next day) or upon user demand. For example, multiple equipment similar to the apparatus 100 or portions thereof may be deployed, in an interconnected fashion, in one or more locations in a store that cover most, if not all, of its cash-touching points, such that every step of the store's cash-handling procedure can be automated, guided, and/or monitored with consistency, efficiency, as well as timely intelligence.

A user 10, such as a retail store cashier, may access and use the apparatus 100 via the user (security) interface 116. As part of the interface 116, a display device 14, such as a liquid crystal display (LCD) screen or a touch screen interface, may show instructions to the user 10 to guide him or her through a beginning-of-shift or end-of-shift (or start-of-day or end-of-day) coin management process as will be described in more detail below. The user 10 could alternatively be a CIT service person delivering or picking up coins and other cash items. The user 10 may be required to sign in using one or more authentication methods, for example, by entering a login name and a password, performing a biometric scan, or inserting a security card or bar code device into a card reader 16. According to some embodiments, two users may sign in at the same time to complete a task. For example, a store employee and an armored car delivery person may both be required to sign in during a delivery or pickup transaction.

Incoming coins may be dumped directly into the apparatus 100, for example, from a till drawer 12 or a coin bag (not shown), and funneled to the coin sorter & counter 106. The incoming coins typically include loose coins (e.g., from a cashier) but may also include rolled coins (e.g., when they are delivered by armored car personnel). The coin sorter & counter 106 may automatically sort the incoming rolled and/or loose coins and count them to determine a total amount and/or an amount of each coin denomination and/or the total value (or value composition) of the coins. The coin count information may be stored in the data storage 104 and/or passed on to a cash management software (or POS system or other database or data storage system) via a communication interface. Optionally, the apparatus 100 includes the coin roller 108 to roll loose coins of the same denomination into standard- or customer-sized rolls such that they become ready for dispensing or bank deposits. The apparatus 100 may also prepare sealed deposits of cash items. The rolled and/or loose coins may be locked in the coin storage mechanism 110 for safekeeping. Incoming notes may be handled in a similar fashion.

Outgoing coins or banknotes may be dispensed into the till drawer 12, a bag, or other types of receptacles or in bundles. Alternatively, outgoing coins and notes may be dispensed into sealed bags or receptacles. The processor 102 may determine a proper amount of coins to be dispensed or the dispense amount may be calculated by the cash management software. Based on the dispense amount, the rolled coin dispenser 114 and the loose coin dispenser 112 may be instructed to release rolled coins only, loose coins only, or a mixture of rolled and loose coins. In some embodiments, banknotes of a predetermined or calculated amount may also be dispensed. Furthermore, the apparatus 100 may record the time/date of the delivery, user and volume/value/denomination of incoming coins and then reconcile against the corresponding order, invoice and/or SLA (e.g., SLA terms and conditions concerning timing and pricing of delivery/pickup orders).

Create or Part-Create Start Fund from Till Content

One important function of the apparatus 100 is the collection and dispensing of cash items for till drawers, for example, at the beginning or end of shift. More particularly, a calculated amount or value of rolled coins, or a combination of rolled and loose coins, and/or notes can be automatically dispensed to create or part-create a start fund for a till.

According to some embodiments of the present invention, the cash items just collected from the till drawer 12 may be counted or calculated and then immediately or subsequently re-dispensed into the same till drawer, thereby using the same cash items counted or calculated at the end of day as start-of day-funds. Thus, the apparatus 100 only need to additionally calculate and dispense into the till drawer 12 a smaller amount of coins to make up a difference (i.e., delta) between the re-dispensed/recycled amount and a full dispense amount needed. According to an alternative embodiment of the present invention, the apparatus 100 may detect the balance in a till drawer (without actually receiving its remaining content) and calculate the delta dispensing value based on the detected balance. The detection may be implemented by weighing the till drawer, applying optical sensing techniques, utilizing a manual count, data from the POS, an automated count from another piece of equipment, any other count of the existing till contents, and/or a combination of these methods.

The actual amount of coins dispensed can be stored in the data storage 104 and/or shared with the cash management software. The process of collecting from and dispensing into the same till drawer may be particularly useful for a cashier to quickly replenish or rebalance his or her till content during a shift when coin levels (or particular denominations) run too high or too low are imbalanced. Any such replenishing, rebalancing, or skimming of till content may be reconciled with other relevant data such as start-of-day amount and expected intake from sales etc.

Further detail of end-of-shift and start-of-shift processes is described below in connection with FIGS. 2 and 3 respectively.

Figure 2:
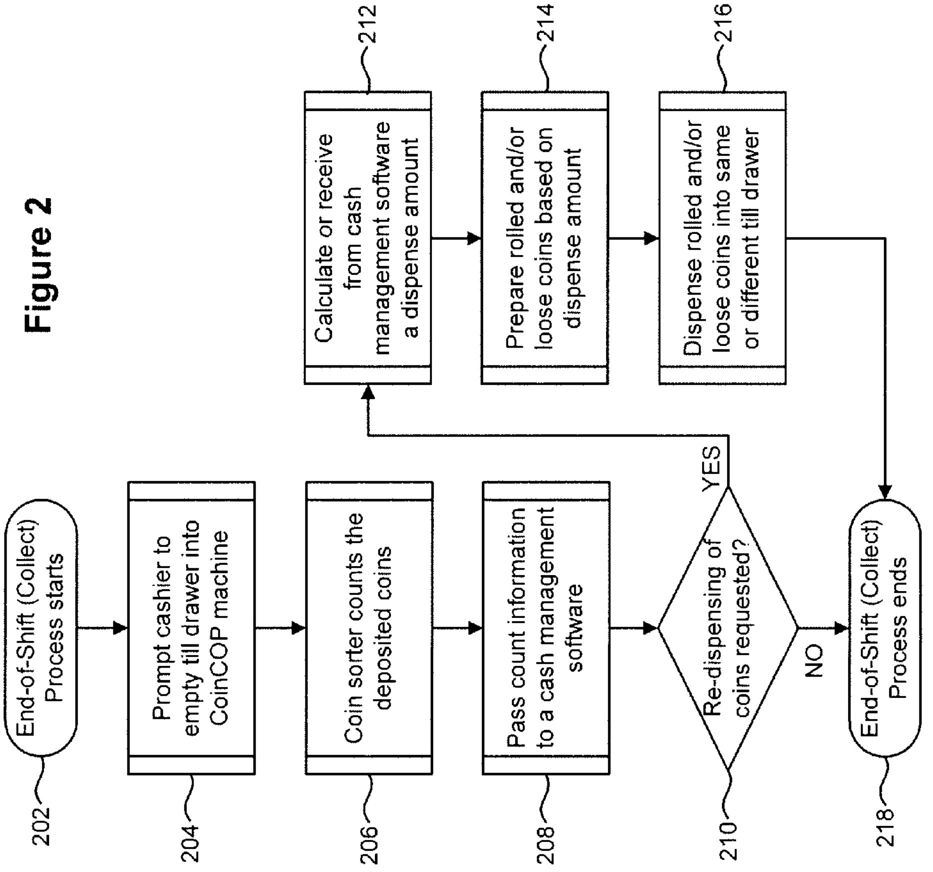
FIG. 2 shows a flow chart illustrating an exemplary end-of-shift cash management process in accordance with one embodiment of the present invention.

FIG. 2 shows a flow chart illustrating an exemplary end-of-shift (or end-of-day) coin management process in accordance with one embodiment of the present invention.

The end-of-shift (or coin-collection) process starts in step 202.

In step 204, a cash handling machine, such as the apparatus 100 or CoinCOP machine shown in FIG. 1, may prompt a cashier who has just finished a retail shift to sign in and then empty his or her till drawer into the machine. According to one embodiment of the present invention, the till content deposited into the cash handling machine may include only loose coins. According to another embodiment, the cash items may include both loose coins and rolled coins. In yet another embodiment, both coins (rolled and loose) and banknotes may be directly dumped into the machine. The cash handling machine may also have optional security features such as one that identifies discrepancies between expected and actual values or volumes.

In step 206, a coin sorter in or coupled to the cash handling machine may automatically count the coins just collected as a result of step 204. The volume or value of the collected rolled coins or combination of rolled and loose coins can be added together. The coin count information may be passed to a cash management software (or POS system or other database) in step 208. Banknotes may be counted and/or sorted in a similar way. The coin count information, in connection with any note count information, may be reconciled with the amount of cash previously dispensed to the same cashier to determine total sales amount received in cash.

Then, in step 210, it may be determined whether re-dispensing of coins is requested. If not, the end-of-shift process may end in step 218. If re-dispensing is requested, the cashier may be instructed to place an empty till drawer in a designated location on the cash handling machine, and a proper dispense amount may be calculated or received from the cash management software in step 212. The proper dispense amount may be determined based on a variety of factors such as the time of the next shift, expected store traffic, and availability of cash items, etc. Alternatively, the dispense amount may be a predetermined value or set of values. The dispense amount may also indicate or define a mixture of coin denominations and/or note denominations to be dispensed. If the coins and/or notes just collected are dispensed back to the same till drawer, the dispense amount will be calculated, based on the amount just collected, to determine the additional amount needed.

Next, in step 214, rolled and/or loose coins as well as notes may be prepared based on the dispense amount including the mixture of denominations. The coins will then be dispensed into a till drawer that may be the same as or different from the one from which coins were just collected in step 204. When properly positioned, the till drawer may have its coin compartments aligned with the coin dispenser on the coin management machine, such that coins of different denominations will fall into their respective compartments with minimal manual arrangement by the cashier. The same or similar could be configured for the dispensing of notes.

Figure 3:
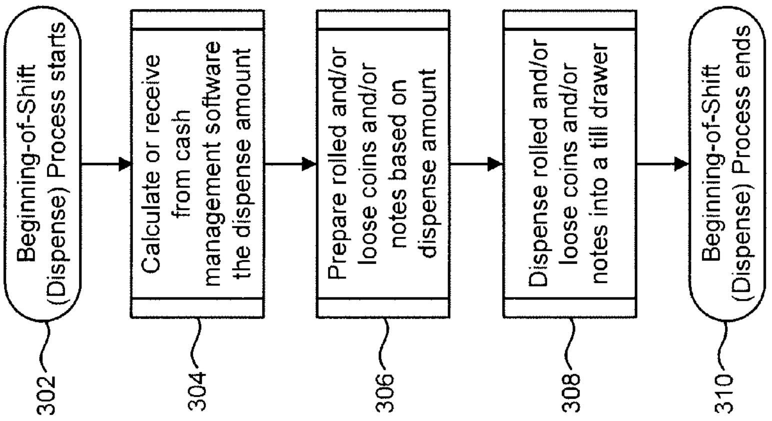
FIG. 3 shows a flow chart illustrating an exemplary beginning-of-shift cash management process in accordance with one embodiment of the present invention.

FIG. 3 shows a flow chart illustrating an exemplary beginning-of-shift cash management process in accordance with one embodiment of the present invention.

The beginning-of-shift (or coin-dispensing) process starts in step 302, for example, upon a user inputted request which, for example, identifies the user and the pre-determined coins/notes (or float) to be dispensed.

In step 304, a proper dispense amount or volume may be calculated or received from a cash management software (or POS system or other database). As mentioned earlier, the proper dispense amount may be determined based on a variety of factors and may also indicate or define a mixture of coin/note denominations to be dispensed.

In step 306, rolled and/or loose coins (and/or notes) in the predetermined mixture of denominations may be prepared based on the dispense amount. Then, in step 308, the coins and/or notes may be dispensed into a till drawer and ready for a cashier to start a shift without manually counting or arranging the coins.

The beginning-of-shift (or coin-dispensing) process ends in step 310.

The entire process illustrated in FIG. 3 may take no more than a few minutes. For an even more expedited process, a coin management machine may pre-assemble rolled and/or loose coins in predetermined or standard dispense amounts and mixtures. The pre-assembled coin packages may be maintained at all times or prepared shortly before the beginning of a next shift. A cashier may be given only 2-3 options for the dispense amount and, as soon as one option is selected, the corresponding coin package may be immediately dispensed into the cashier's till drawer. The supervisor of the software may also set a pre-determined value to be dispensed once the user signs on.

It should be appreciated by those skilled in the art that the end-of-shift and the beginning-of-shift processes shown in FIGS. 2 and 3 are also applicable to end-of-day or beginning-of-day processing and they do not necessarily have to occur at the end or the beginning of shifts or days. In fact, a cashier can take a till drawer to the coin management machine to reconcile and/or rebalance coin or cash contents of the till drawer during a regular shift or at other times as needed.

Third Party Management & Communications

According to some embodiments of the present invention, the apparatus 100 or another linked device may be configured with third-party-management functions, and the user 10 may occasionally be a third party such as armored car service, bank or other service provider. Via a communication interface (e.g., wired or wireless network connections), the processor 102 may automatically issue orders for coins and/or banknotes to a bank or an armored car service provider. The timing, amount, and composition of the orders are based on the total amount of cash items being held by the apparatus 100 (and/or in-store total amount) as well as the denomination compositions of those cash items, as compared against predetermined parameters set by a cash management software. The value and volume of the orders may also be based on projected revenues so as to optimize delivery decisions. When the total amount and/or individual denominations of cash items are too low or too high, a delivery or pickup order can be automatically triggered (with or without human review). For example, the parameters (e.g., timing, amount, and composition) of the delivery and/or pickup orders may be either directly communicated to the third party or be included in an alert issued to store personnel who in turn could verify and place the orders. Alternatively, order forms may be prepared or pre-notification may be sent to the bank concerning the orders.

When the third party shows up for the delivery of a change order, the apparatus 100 may interact with the third-party personnel (now as user 10) to automatically count the delivered cash items, report the transaction(s), and/or reconcile against an order delivered by the third party. The apparatus 100 may further record the delivery time, time from order, and/or delivered value or volume and compare these data against service level agreements, ordered value, and notice provided etc. The reconciliation with service level agreements and order parameters (e.g., timing and amount/value) is beneficial as it can help a store avoid overcharges or unnecessary charges by third parties such as armored car companies. The apparatus 100 may automatically generate credit notes and issue them to the third party. Coins delivered to multiple locations (e.g., coin machines and safes) within the store are all captured and tallied against the order placed. Where the retailer pays for a float order with takings, the apparatus 100 may count the coin (rolled or loose) and issue a command to the note dispenser/recycler to dispense the required number of notes. In other words, the apparatus 100 counts the delivered rolled coins and issues bills against that delivery, much like a change machine working in reverse.

For bank deposit, whether it is through third-party service or walk-to-bank by a retail employee, the timing and/or value/makeup of deposits may be automatically determined by a cash management software or cash-handling device. According to some embodiments, the scheduling of deposits may be optimized based upon a number of factors, including but not limited to total value and composition of cash items in store, distribution of cash items among cash-handling devices, expected intake or float value, timing constraints of third-party or walk-to-bank processes, costs associated with third-party services, and bank charges, etc. Even if the bank deposits are pre-scheduled (e.g., for armored car it might be three times a week, or for walk to bank it might be every day), it may still be desirable optimize the value and makeup of each deposit, automatically dispense cash items (e.g., to third party or walk-to-bank employee) according to the optimized value and makeup, and/or prepare deposit slip accordingly. The optimization or preparation of cash items for bank deposits may be either based on a combination of various factors or in accordance with simple business rules or guidelines.

Further detail of third party management and communications is described below in connection with FIG. 4.

Figure 4:
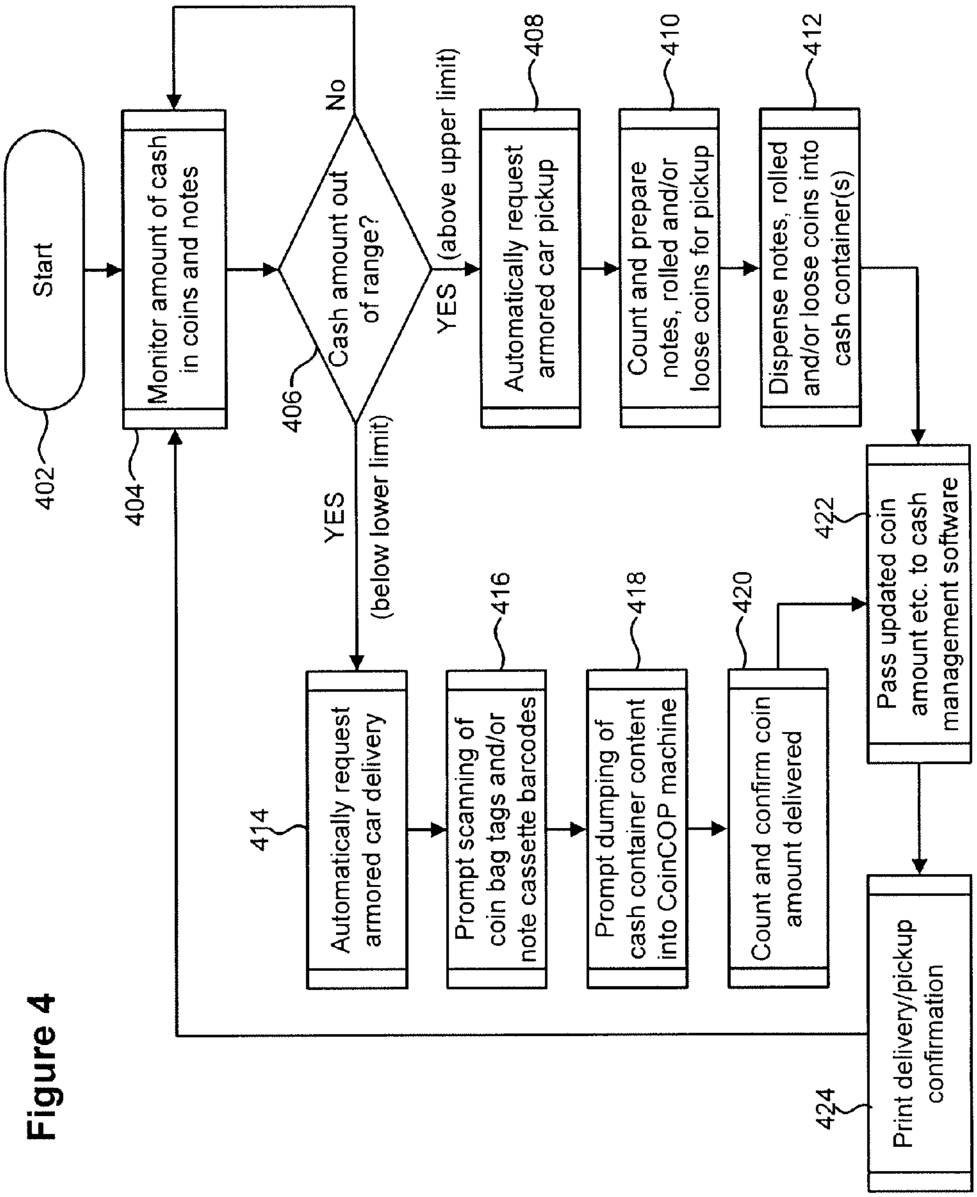
FIG. 4 shows a flow chart illustrating an exemplary cash management process for automated interactions with third parties in accordance with one embodiment of the present invention.

FIG. 4 shows a flow chart illustrating an exemplary coin management process for automated interactions with third parties in accordance with one embodiment of the present invention. This process starts in step 402 and may be kept running for as long as a cash handling machine or a retail store is in operation.

In step 404, the cash handling machine may monitor a total amount of cash that is in coins/notes and/or the amount of coins/notes in each denomination. The monitoring is accomplished through a tight process control or workflow management that keeps track of all the cash-handling and cash-storing devices and their contents, or from the readings on cash handling devices.

Periodically, in step 406, it may be determined whether the coin/note amount is out of range. The coin/note amount may refer to a total amount of coins/notes currently on hand in the retail store, which typically includes coins/notes stored in the cash handling machine and/or a vault but may also include an estimated or actual amount of coins/notes currently distributed in cashiers' till drawers. The coin/note amount may also refer to the amount of coins/notes in each denomination. It is desirable to maintain the total amount of coins/notes as well as coins/notes in each denomination within a predetermined range. Too high or too low a level of coin/note reserve would be detrimental to the operation, security, and/or finance of the retail business. The range for coin/note amount may be dynamically or periodically adjusted by a cash management software based on a number of factors, such as store size, customer demographics, time of day, day of week, sales volume, armored car costs, location, and bank charges, etc. That is, the change orders and deposit values/denominations may be optimized based not only on what is in the store (e.g., expected store activities, current and projected float levels) but also on various external costs (e.g., delivery costs, bank charges, location).

According to some embodiments, although the cash management software determines the when and what about a change order or bank deposit, the human users such as authorized store personnel may be allowed certain leeway to override the machine decisions. For example, an authorized user may temporarily delay or move up a change order or bank deposit or alter the amount/composition of the order or deposit. However, it is preferable for the cash handling machine and/or related cash management software to issue alerts or warnings whenever an override occurs.

If it is determined that the coin/note amount or volume is within its proper range, the process may loop back to step 404 to continue monitoring the coin/note amount/volume.

If the coin/note amount is above an upper limit (e.g., excessive float level or too many coins of certain denominations), then, in step 408, the cash handling machine or a related cash management software may automatically request an armored car pickup service to remove the excess amount. Apart from the coin/note amount/volume, parameters such as armored car schedules, service contracts, pricing and costs of armored car pickups, pricing and costs of bank charges as they relate to deposit values or makeup, etc. may also be used to determine the optimum pick up or delivery times as well as the optimum value and composition of cash items to be deposited or ordered.

The request may be made via any of a number of communication means, such as an automated telephone call, an instant message or text message, an electronic mail message, or an Internet-based request form. Alternatively, instead of a request, an alert or report may be issued to either a store or corporate employee to a similar effect. The request, alert, or report may specify the store location, amount to be picked up, and desired time of pickup, etc. According to one embodiment of the present invention, the request may further include a unique passcode matched up with the particular pickup request. The entry of the passcode at the cash handling machine around the correct time may initiate an expedited process of cash pickup. Furthermore, cash pickup may be denied without the correct passcode. In an alternative embodiment, the cash handling machine or cash management software may prompt a store manager or other personnel to manually make the request for an armored car pickup.

In step 410, upon or preferably even before the arrival of the armored car, the cash handling machine may start counting and preparing cash items for pickup. According some embodiments, a unique ID (e.g., barcode or RFID) may be put on a tamper-evident storage device that contains the prepared cash items. The unique ID may be used by the armored car personnel to verify/confirm the order or it may be used by the bank to reconcile with a provisional credit request or for reconciliation of credit already provided.

In step 412, an armored car service person may interact with the cash-handling machine to become authenticated and authorized to retrieve coins. The banknotes, rolled and/or loose coins already prepared may now be dispensed into cash containers to be loaded into the armored car. According to one embodiment of the present invention, the dispensing of cash items for pickup may use essentially the same mechanism for dispensing coins and notes into till drawers. According to other embodiments, the batch pickup of notes/coins may employ a different access mechanism.

If it is determined in step 406 that the coin/note amount is below a lower limit (e.g., inadequate float level or too few coins of certain denominations), then, in step 414, the cash handling machine or the related cash management software may automatically request an armored car delivery service to replenish the coin/note reserve. The request or float order may be placed via any of a number of communication means and may specify the store location, amount to be delivered (including mixture of denominations), and desired time of delivery, etc.

In step 416, an armored car service person delivering the requested coins/notes may interact with the cash handling machine and may be prompted to scan the tags of coin bags or cash cassettes. The tags may show machine-readable bar codes or other symbols or may contain electronic memory or identification devices such as radio frequency identification devices (RFIDs). The scanning of the coin bag tags or other ID devices may serve to authenticate the armored car service person and confirm the desired amount of delivery. Alternatively or additionally, the armored car service person may be required to sign in before performing the delivery (or pickup), or both the armored car service person and a store employee have to log in to complete/verify the delivery (or pickup) transaction.

In step 418, the armored car service person may be prompted to dump the coin bag or cash cassette contents into the cash handling machine or otherwise load the delivered coins into the machine. Then, in step 420, the machine may automatically count/weigh the rolled and/or loose coins delivered (and/or count the notes) and confirm whether the total amount and individual denominations match the requested amount. The machine may be sealed (such that operators do not have access to stored coins) and also able to count rolled coins into the machine. The machine may securely store the delivered cash items and further restrict unauthorized dispense of cash items. The machine may automatically issue a credit note for discrepancies. According to some embodiments of the present invention, a banknote dispensing device in or coupled to the coin management machine may dispense notes in the same amount as the coin/note amount delivered (or plus some service fees) to pay the armored car service for the float order. Alternatively, the payment may be made by producing a deposit of notes/coins (into a container, e.g., cassette or bag) of the same value.

Alternatively, regardless of the determination in Step 406, the cash handling machine or a related cash management software may automatically issue a command or alert for a walk-to-bank process to be initiated whereby a human user may visit a bank to deposit or order cash items. Again, the cash handling hardware and software can provide detailed instructions with control parameters regarding the when and what of such walk-to-bank process, and the compliance with such instructions may be monitored and recorded. For instance, for a walk-to-bank deposit, a user may be first authenticated and authorized by a cash handling machine before a coin bag or note cassette is released into his/her custody. A deposit slip or the like may also be printed out for the user to bring to the bank. The machine may further specify a time period during the user has to complete the task and may demand a deposit receipt or a check-in upon the user's return. For a walk-to-bank change order, the user may also sign into a machine to receive a withdrawal form (with change order information) to take to the bank. The machine may also specify a time period during the user has to complete the task and require that the ordered cash items be deposited into the machine immediately upon the user's return. In both walk-to-bank scenarios, the machine may communicate with the bank, for example, to give notification of an upcoming change order or deposit, to receive confirmation/verification of any credit/debit to the relevant bank accounts, and to gauge the progress of the walk-to-bank process. In the walk-to-bank embodiment, it is also advantageous to calculate optimal values and makeup of cash items for either bank deposits or change orders.

Upon completion of a coin and/or note pickup or delivery, in step 422, an updated cash amount may be recorded and/or passed to the cash management software. In fact, a store's cash management network and related devices can be configured such that any addition or removal of cash from anywhere in the store (e.g., CoinCOP machine(s), safe(s), and vault(s)) will be captured in real time (or by end of day or next day) and updated to the cash management software. Next, in step 424, a confirmation receipt for the cash pickup or delivery job may be printed out and the process may loop back to step 404 to continue monitoring the coin/note amount, or the confirmation may be transmitted via a data link to a handheld delivery/collection record device used by the armored car personnel.

During, or after completion of, a delivery or pickup of cash items, the timing of the delivery/pickup may be recorded, as well as order dates, and this timing information may be compared to SLAs or order/command issued. For example, a record of what was delivered and when it was delivered, as compared to what was ordered and when it was ordered, certain unnecessary expenses may be avoided or corrected, such as over-charge for next-day delivery when the delivery did not occur the day after the order or when the order did not request next-day service.

Whether it is an order for delivery or pickup of cash items, a passcode, barcode, or other unique order identifier could be generated based on the order parameters (e.g., amount, composition, timing, store ID, etc.). When the coins and/or notes are delivered to or picked up from a cash-handling apparatus (as described above), the actual count value of the cash items (and time of order fulfillment) may be captured and then reconciled with that passcode, barcode, or unique order identifier. This verification mechanism may be useful to ensure the orders are correctly and timely fulfilled. If the reconciliation is unsuccessful, an alert or exception notification may be automatically issued to a store or corporate employee or even the armored car delivery or management personnel.

Dual-Use Cash-Handling Apparatus

According to some embodiments of the present invention, a self-service device (e.g., coin deposit machine, kiosk or self-checkout lane) may be configured to both perform the cash-management functions of a retail store and serve its customers and the public for their coin-counting, change-making, product ordering, or self-checkout needs. That is, these customer-facing, dual-use devices may, for example, help create and dispense start-of-day (or start-of-shift) funds and/or collect and count till contents at the end of a day (or shift), or provide change for a till and then record the data related to the transaction such as user ID, as described above. This is a significant improvement over existing self-service devices each of which can only perform coin/note counting or checkout functions for its own self-service functions and cannot assist in any form of cash management (e.g., counting, dispensing, reconciliation or any other data storage or manipulation) as it relates to another lane or equipment. This removes the need for two separate pieces of equipment.

Similar to the novel use of self-service or self-check devices, a hybrid type of checkout equipment (e.g., where a cashier scans merchandise and the customer interacts with a self-service payment device) may also be used to handle cash items from another lane or equipment. Broadly speaking, according to embodiments of the present invention, any device which manages the transactions at one point of purchase, till or self service device may be used to count or reconcile cash contents of another till, self service device, or point of purchase.

According to embodiments of the present invention, when these dual-use devices are idling between services to customers, store cashiers (who work at other, regular lanes) may also use these devices to rebalance their tills, put away excess notes, and/or get additional changes, etc. The dual-use devices may also perform the third-party management/communications as described above. For example, one of the dual-use devices may automatically issue an order to a third party or communicate an order alert/notification to a store manager. When an armored car delivery person comes to the store, he or she may dump the content of a coin bag (e.g., rolled and loose coins) or notes (e.g., $1 bills) into a Coinstar-like dual-use machine or at a dual-use self-checkout lane which then counts and securely stores the cash items. The dual-use cash-handling apparatus may be further configured to deposit coins/notes into a tamper evident cassette or bag, with or without unique ID, and/or generate other outputs for the enablement of provisional credit, as described in more detail below. As a result, a self-service device that collects payments directly from the public can now be used for in-store cash management, such as helping manage cash from another lane/till and/or providing an output to a third party for provisional credit purposes.

Alternatively, the above-described cash-handling or cash-management apparatus 100 may be configured to include those self-service functions. That is, in addition to the above-mentioned retail store personnel and third-party service providers (e.g., armored car personnel), the user 10 may be a self-service customer. For example, the apparatus 100 may be set up in a customer-accessible location in a retail store and may include a customer-friendly user interface to guide a customer through a self-service coin counting process. Alternatively or additionally, the apparatus 100 may be configured to perform a change machine's functions for customers.

According to one embodiment, a customer-friendly user interface may be the default interface displayed on a dual-use cash-handling apparatus.

When other types of users need to use the apparatus 100, they may need to go through an authentication process before they are allowed to access the coin-management and third-party-management interfaces. In other words, the apparatus 100 is turned into a dual-use device that is both a self-service or consumer-facing equipment and a coin/cash management depository that perform cash office functions, and the two sets of functions can be toggled depending on user authentication or absence thereof, for example. When a cashier shows up and enters the correct login information, the apparatus 100 can accept deposits, dispense coin or other cash items into a till, create a till start fund, and/or count and store end-of-day/end-of-shift (or excess) funds and then calculate the dispense amounts. When a store customer shows up, he or she is greeted by default with the consumer-facing interface.

According to yet another embodiment of the present invention, a customer-facing deposit device, such as a Coinstar® machine, kiosk, or self-checkout lane equipment, may be adapted and configured to perform the above described in-store cash-management tasks upon demand. For example, a cashier may go to a customer-facing device to have it dispense cash items into a till, create a start fund, or rebalance the till content. Such a customer-facing device may also accept end-of-day (or end-of-shift) deposits and reconcile them with the electronic point-of-sales (EPOS) system.

Mobile Platform Linked to Back Office

The apparatus 100 and/or related cash-handling devices (dispensing or recycling), or portion(s) thereof, may be implemented on a mobile platform for processing cash items at the till point. The mobile platform is preferably linked to one or more back-office devices, such that the coins (or float) dispensed in the back office can be reconciled with coins (or float) deposited into a till dispensing or recycling device. Also, the coins (or float) required for a till dispensing (or recycling) device at the point of purchase may be automatically calculated, and this calculated amount can be dispensed by the mobile device(s).

In an alternative embodiment of the present invention, one or more mobile devices may completely replace the back office devices and can be linked to either a store or corporate cash management software or the EPOS. The mobile device (s) may be taken to the POS and perform the fund creation, change making, and skimming functions all the front of the store.

The EPOS system and/or the back office software may be used to keep track of and reconcile start fund dispensed to each till, expected intake of cash from sales, any adjustment made to each till due to rebalancing or skimming, and end-of-day (or end-of-shift) collection amount from each till. For example, anytime a till is opened for rebalancing or skimming will cause a flag or annotation to be made to a corresponding record of that till in the EPOS or back-office database. A unique transaction ID and a record reflecting the rebalancing or skimming amount (and/or other parameters such as date, time, operator(s), and detail of cash items) can be generated by the mobile device. That transaction ID and the record may be either transmitted to the EPOS or back-office software in real-time (or near real-time), via a wireless or wired connection or via a manual input, or uploaded to those databases at or by end of the day (or end of the shift). Such data from the mobile device may be then reconciled with the rest of the transactional data and/or cash management data concerning the various tills.

Self-Sealing Receptacles & Recycle-Deposit Combinational Devices

Figure 5:
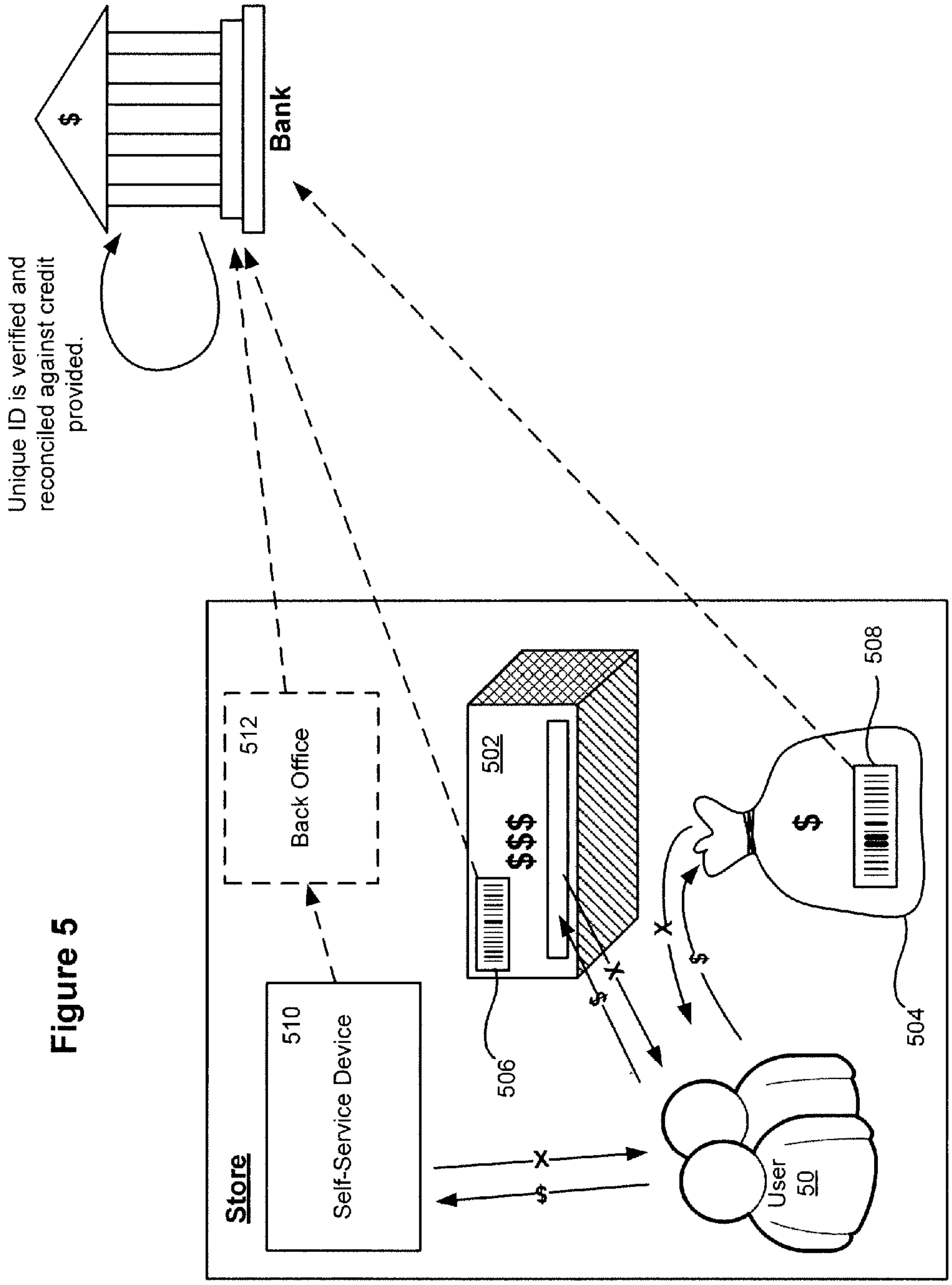
FIG. 5 illustrates new exemplary methods for any store to receive provisional credit with the use of self-sealing receptacles and associated unique identifiers in accordance with one embodiment of the present invention.

FIG. 5 illustrates new exemplary methods for any store to receive provisional credit with the use of self-sealing receptacles and associated unique identifiers in accordance with one embodiment of the present invention.

To overcome the aforementioned problems and deficiencies of prior approaches for provisional credit, embodiments of the present invention provide for one or more self-sealing cash receptacles coupled to a wide variety of cash-handling or cash-management devices such as note dispensers, teller cash recyclers, other note recycling equipment, coin recycling equipment, self-service devices (e.g., kiosk or self-checkout lane), and etc. Currently, the use of self-sealing receptacles has been limited to bill validators (otherwise known as note acceptors), which has restricted the ability of stores or other businesses to benefit from provisional credit.

According to some embodiments, bill validators may be implemented with self-sealing devices in self checkouts and/ or kiosks. Data reflecting any cash item deposited via such bill validators into the self-sealing devices may be outputted and communicated to a bank or service provider for provisional credit purposes. This way, provisional credit can be obtained without the need to take the cash to a back office.

The self-sealing cash receptacles may take the exemplary forms of a cassette 502 or a coin or cash bag 504, as shown in FIG. 5. Each receptacle may allow cash items such as coins and banknotes to be deposited directly into it and will securely store the cash items and prohibit the removal thereof. More specifically, the cassette 502 or bag 504 may be securely attach to a note dispenser, teller cash recycler, other note recycling equipment, coin recycling equipment, coin counter, coin sorter, note sorter, or self-service device (e.g., kiosk or self-checkout lane), etc. to receive counted (and/or bundled) notes. According to one embodiment, the secure (or secure-mode) note dispenser, teller cash recycler, other note recycling equipment, coin recycling equipment, coin counter, coin sorter, note sorter or self-service device (e.g., kiosk or self-checkout lane) may either place counted notes directly into a pre-existing self-sealing receptacle or wrap them into a bundle with a sealed, tamper-proof or tamper-evident packaging (i.e., creating a new self-sealing receptacle).

Self-sealing receptacles can also be implemented in connection with a self-service device 510, such as a self-service kiosk, a self-checkout lane, or other customer-facing devices. As described above, these customer-facing devices may be configured to serve as dual-use cash-management apparatus. The self-service device 510 may output data reflecting the amount of cash items securely deposited into its associated receptacles. The data may be transmitted to a back office system 512 and/or the bank for purposes of receiving provisional credit. The self-service device 510 can also communicate, or cause the store to communicate, directly with third parties such as banks and armored car service providers. With self-sealing receptacles, the armored car personnel may come directly to these apparatuses to pick up cash items contained in these receptacles without going to the back office. The self-sealing receptacles may also be walked to the bank by a retail employee. With the unique ID described below, provisional credit can be given and later reconciled.

According to additional embodiments of the present invention, self-sealing devices or receptacles may also be attached to a coin/note counting, recycling, or dispensing device, such as a CoinCOP machine as described above. Such receptacles may also be attached or coupled to a note dispensing or recycling device.

Each cash receptacle and/or each cash device (from which the receptacle content originates) may comprise a unique identification (ID) to allow reconciliation of provisional credit. The unique ID may be a tamper-proof or tamper-evident identifier which may be, for example, a human- or machine-readable symbol such as a one- or two-dimensional barcode or a radio-frequency ID (RFID) tag, or other identification mechanism. According to one embodiment, the receptacle ID may be dynamically generated and have a meaningful value calculated based on such information as the amount of cash deposited into the receptacle and/or the time and date of the deposits, etc. With authentication mechanism built in (e.g., ID values being generated from secret algorithm and/or carrying encrypted data), the receptacle ID is unique and cannot be faked or altered.

The request for provisional credit (including the cash amount secured in a receptacle) may be communicated to a depository bank in a number of ways, such as via direct data link, electronic email, instant message, telephone call, or facsimile, with or without additional security measures. As soon as it receives the request, the bank may give the store provisional credit, i.e., by crediting the store's bank account. Subsequently, when the receptacle is delivered to the bank for actual deposit, the bank may verify the unique ID of the receptacle for authenticity (e.g., by reconciling the ID with an expected cash deposit value and/or the credit already given).

Later on, the store personnel may walk the receptacles (502, 504) with their cash contents intact to the bank or use an armored car service. The bank will then reconcile the actual cash deposits directly against the previously given provisional credit based on the unique IDs. Alternatively, according to another embodiment, the armored car personnel may use an ID reading device (e.g., RFID tag reader or barcode reader) to obtain the receptacle ID information when the receptacles are being picked up.

According to another embodiment of the present invention, a cash recycling device may include or be coupled to a deposit compartment, wherein the cash management software determines how much cash is needed for store operations using either a predetermined or calculated value or volume of coins/notes and then off-sorts (sets aside) excess notes into a deposit compartment (or the equivalent) which then transmits a provisional credit amount. Such a recycle-deposit combinational device can intelligently coordinate the operations of a cash recycling function with a cash depositing function, as well as providing valuable data as a result of these functions. Essentially, the cash management system can dynamically determine an excess amount of cash items and then skim that amount for deposit.

Such dynamic determination and "skimming" may be coupled with the above-described self-sealing device(s), such as Coinstar machines or self-checkout lanes, to obtain provisional credit for the store. For example, within a kiosk or self-service device that is utilizing a recycling device to off-sort excess cash to a self-sealing receptacle (e.g., by either calculating expected requirements, or picking a specific value of either cash or each denomination), the recycler may place the excess notes (or coins) in a secure compartment and store the data related to the value or volume of the excess notes (or coins). This data may then be outputted for purposes of obtaining provisional credit. The data may be either sent to an armored car company, bank, or other service provider, or accumulated in software/database and then sent to third parties. The secure compartment may take the form of a self-sealing receptacle which may have a unique ID and value associated with it.

Conversely, a tamper-proof or tamper-evident secure storage module (e.g., compartment or container) may be included in a retailer's cash-handling apparatus to hold CIT- or bank-owned cash items yet to be released to the retail store. That is, a CIT service provider or a bank might leave some amount of cash items securely held in one of the cash-handling apparatuses (but kept segregated from the retailer's own cash items) even before the retailer orders a next delivery of coins or banknotes. When the retailer needs additional coins and/or banknotes (e.g., as automatically determined by the methods and apparatuses described above), an order that would otherwise be fulfilled by a delivery may be promptly filled with an immediate release of the desired amount and composition of cash items directly from the secure storage module. Upon the release, the same amount may be debited from the retailer's CIT/bank account along with any associated cost. The released cash items become the retailer's cash fund and may be either stored in a separate storage device within the same cash-handling apparatus or dispensed to a separate device. Essentially, this is like provisional credit working in reverse. The release of cash items may also trigger an invoice to the retailer for costs associated with the service. According to one embodiment of the present invention, the same sorting/counting device in the cash-handling apparatus may receive and count cash items whether they are inputted from an external source (e.g., collected from a till drawer) or released from the secure storage device. The cash-handling apparatus may be configured to distinguish an origin of the cash items counted and record a change of ownership of any third-party cash item released from the secure storage module.

At this point, it should be appreciated by those skilled in the art that the above-described methods and apparatus for handling and managing coins are, with few exceptions, equally applicable to the handling and management of banknotes. For example, the automatic counting, sorting, wrapping, and dispensing techniques for coins also similarly exist for banknotes. Therefore, the end-of-day or part-of-day deposit, the calculation of till balance, and the dispensing of start-of-day fund, etc. may include banknotes as well as coins, much in the same way as described above.

Moreover, although the foregoing description makes frequent reference to a retail environment such as a department store, it should also be noted that the methods and apparatus described above can also be implemented, in full or in part, in a number of different contexts and by different entities, such as a bank branch, an offsite processing location (away from retail premises), a central depot type of place, a shopping mall, a sports arena, a restaurant or cafeteria, a quick-serve or fast-food restaurant, a coffee shop, a theme park, a transit station, or a casino etc.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the claims that might ultimately issue from the present disclosure.

The invention claimed is:

1. An apparatus for handling cash items, said apparatus comprising:

a sorting/counting device to receive and count cash items containing at least loose coins, and to sort said loose coins into a coin storage space;

at least one storage module housing at least said coin storage space to receive said sorted loose coins;

at least one processor to process data from said sorting/counting device and/or said at least one storage module and to output information concerning said cash items;

at least one data storage device to record said data and/or said output information;

at least one interface to communicate said data and/or said output information to one or more other devices or users;

a coin dispenser to dispense at least one roll of coins based on said data and/or said output information; and a detection module to determine or estimate a balance of cash items in a removable container.

2. The apparatus of claim 1, wherein said at least one processor is further configured to issue, to said coin dispenser, a command comprising amounts and denominations of said at least one roll of coins.

3. The apparatus of claim 2, wherein said coin dispenser is configured to dispense a mixture of rolled coins and loose coins.

4. The apparatus of claim 1, wherein said sorting/counting device is further configured to sort and count cash items containing banknotes.

5. The apparatus of claim 1, wherein said balance of cash items is determined based on an input via said at least one interface.

6. The apparatus of claim 5, wherein said input comprises a manual count of said cash items in said removable container.

7. The apparatus of claim 5, wherein said input comprises a projected count of said cash items in said removable container, said projected count being generated by a point-of-sale software and/or a cash management software.

8. The apparatus of claim 1, wherein said at least one processor is further configured to calculate, based at least upon said balance of cash items, a composition of additional cash items to be dispensed into said removable container.

9. The apparatus of claim 8, wherein said composition of additional cash items comprise at least rolled coins.

* * * * *